T. STURTEWAGEN.
ICE CREAM FREEZING MACHINE.
APPLICATION FILED MAY 10, 1912.

1,051,355.

Patented Jan. 21, 1913.

Witnesses
H. W. Primm
Edwin J. Beller

Inventor
T. Sturtewagen
by Wilkinson, Fisher, Witherspoon
& Mackaye
Attorneys.

COLUMBIA PLANOGRAPH CO., WASHINGTON, D. C.

UNITED STATES PATENT OFFICE.

THEOPHILE STURTEWAGEN, OF BATH, ENGLAND.

ICE-CREAM-FREEZING MACHINE.

1,051,355.     Specification of Letters Patent.     Patented Jan. 21, 1913.

Application filed May 10, 1912. Serial No. 696,433.

*To all whom it may concern:*

Be it known that I, THEOPHILE STURTEWAGEN, a subject of the King of Great Britain and Ireland, residing at Bath, Kingdom of Great Britain and Ireland, have invented certain new and useful Improvements in Ice-Cream-Freezing Machines; and I do hereby declare the following to be a full, clear, and exact description of the invention, such as will enable others skilled in the art to which it appertains to make and use the same.

This invention relates to ice-cream freezing machines of the type in which the cream container is located between an external and an internal freezing agent receptacle.

This invention has for its object to provide an improved construction of machine of the said type.

In my improved machine the three said vessels are arranged concentrically, the cream container being located between the two freezing vessels which are charged with ice and salt or other suitable freezing mixture or freezing agent employed, and the internal freezer and the cream container are adapted to be rotated in the same direction, stationary scrapers acting also as agitators or beaters being arranged to scape the interior of the cream container and the exterior of the internal freezer. The scrapers dislodge and break up any particles or frozen lumps of cream adhering to the surfaces on which the scrapers act.

Figure 1:
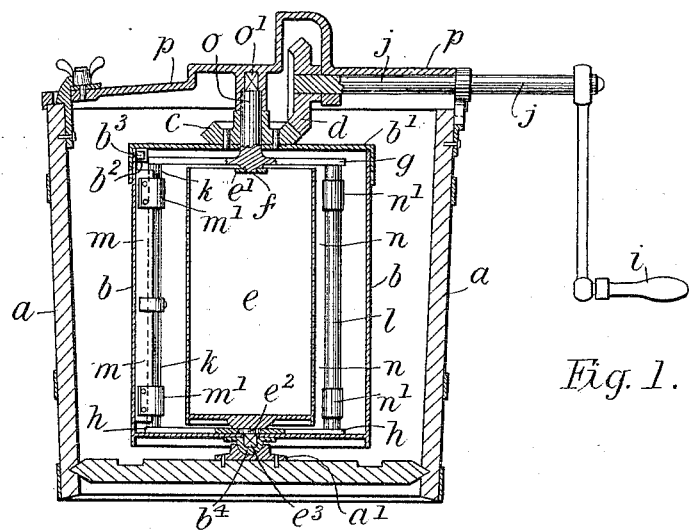
Figure 2:
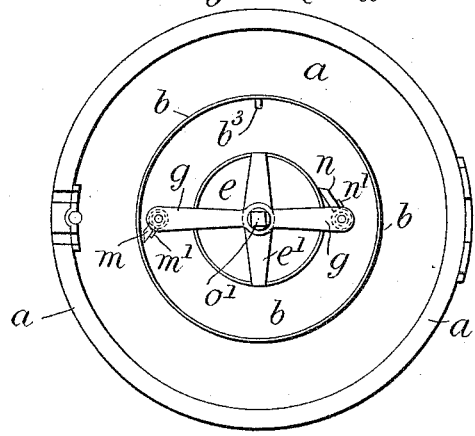
Figure 3:
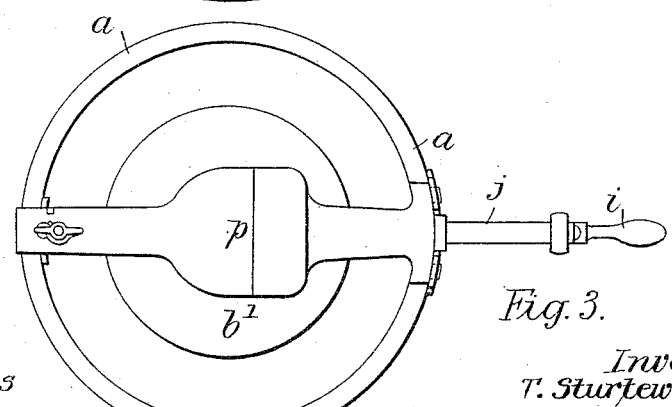

Referring to the accompanying drawings, Figure 1 is a vertical sectional view of my improved ice-cream freezing machine. Fig. 2 is a plan with the cover of the cream container and the other parts above it removed. Fig. 3 is a plan.

The external freezing agent receptacle $a$ is a pail or bucket. Situated concentrically therein is the cream container $b$ the cover $b^1$ of which carries a bevel wheel $c$ which is fixed on the cover $b^1$ and gears with a bevel wheel $d$ fixed on the driving spindle $j$. The cover $b^1$ of the cream container $b$ has fixed to it a stop $b^2$ projecting downward from its under face. A stop $b^3$ is fixed inside the vessel $b$ and projects inwardly. By the provision of the stops $b^2$ and $b^3$ which engage each other, the vessel $b$ is driven when the machine is in action. At the under face of its bottom the vessel $b$ has a boss $b^4$ which beds in a socket $a^1$ fixed to the inside of the bottom of the external freezer $a$. The boss $b^4$ is a trunnion to the cream container $b$. Centrally in the boss $b^4$ is a squared or rectangular recess.

The internal freezing agent receptacle $e$, which is centrally situated in the cream container $b$, is open at top, and across it thereat extends a flat bar $e^1$ in a hole in which loosely fits a journal or stud $f$ projecting down from the top cross-bar $g$ of the stationary frame which carries the scrapers. The vessel $e$ is charged with ice and salt or other freezing mixture or agent such as is ordinarily employed in such machines, as also is the space between the inside of the bucket $a$ and the exterior of the cream container $b$. Under the bottom of the internal freezer $e$ is a journal which has a cylindrical part $e^2$ and a part $e^3$ which is square or rectangular in section. The cylindrical part $e^2$ loosely fits in the bottom cross-bar $h$ of the stationary frame which carries the scrapers. The square part $e^3$ of the journal of the vessel $e$ fits into a correspondingly squared socket provided for it in the boss $b^4$. Consequently, the vessel $e$ is rotated bodily with the cream container $b$ and in the same direction.

The motion from the driving handle $i$ is transmitted through the spindle $j$ to the bevel wheel $d$ which gears with the wheel $c$ fixed, as aforesaid, to the cover $b^1$ of the cream container $b$. Fixed in the cross-bars $g$ and $h$ of the scraper frame are vertical rods $k$ and $l$. The rod $k$ carries a vertical scraper $m$ which is held to the rod $k$ by straps $m^1$. The scraping edge of the scraper $m$ is held in contact with the internal face of the ice cream container $b$ which face it scrapes as the vessel rotates. The rod $l$ carries a vertical scraper $n$ which is held to the rod $l$ by straps $n^1$. The scraper $n$ scrapes the outside of the internal freezing vessel $e$. From the top cross-bar $g$ of the scraper frame extends the vertical arm $o$ which is cylindrical where it loosely passes through the cover $b^1$ of the vessel $b$ and the bevel wheel $c$. Toward its upper end the arm $o$ has a part $o^1$ which is square in section. This squared part fits into a correspondingly squared socket provided in the casting $p$ which is clamped on the outer vessel $a$ and carries the driving spindle $j$ and the hand lever. The scraper frame is thus kept stationary while the vessels $b$ and $e$ rotate. The crossbar $h$ of the scraper frame is in contact with the inner face of the bottom of the cream container b and acts as a scraper thereto.

What I claim is:—

In an ice cream freezing machine, the combination of an outer freezing agent container having a bearing centrally in the bottom thereof, a cream receptacle provided with a journal to fit said bearing, said journal having a square recess therein opening through the bottom of said receptacle, a second freezing agent container located within said cream receptacle and having a boss projecting from the bottom thereof, said boss being circular for a portion of its length and having its end squared to fit the recess in said journal whereby said receptacle and second container may be secured to rotate together, a flat bar extending diametrically across the upper end of said second container having a bearing therein, means for causing the rotation of said cream receptacle, a stationary frame secured within said receptacle having a bearing in its lower portion adapted to accommodate the circular portion of said boss, and a journal depending from its upper portion adapted to be received into the bearing in said flat bar, and scrapers carried by said frame, one of said scrapers bearing against the inner wall of said receptacle, the other of said scrapers bearing against the outer wall of said second freezing agent container.

In testimony whereof, I affix my signature, in presence of two witnesses.

THEOPHILE STURTEWAGEN.

Witnesses:
 A. E. BURT,
 E. H. HOLLEY.

---

Copies of this patent may be obtained for five cents each, by addressing the "Commissioner of Patents, Washington, D. C."